W. G. & L. T. DAVIS.
COMBINED HARVESTER AND THRESHER.

No. 96,896.                Patented Nov. 16, 1869.

Witnesses.
H. J. Burns
Wm Arthur

Inventors.
Wm. G. Davis
L. T. Davis

W. G. & L. T. DAVIS.
COMBINED HARVESTER AND THRESHER.

No. 96,896.

Patented Nov. 16, 1869.

Witnesses.
H. J. Burns
Wm Arthur

Inventors.
Wm G. Davis
L. T. Davis

W. G. & L. T. DAVIS.
COMBINED HARVESTER AND THRESHER.

Patented Nov. 16, 1869.

Witnesses.
H. J. Burns
Wm Arthur

Inventors.
Wm G. Davis
L. T. Davis

W. G. & L. T. DAVIS.
COMBINED HARVESTER AND THRESHER.

No. 96,896.  Patented Nov. 16, 1869.

Witnesses:

Inventors:

United States Patent Office.

WILLIAM G. DAVIS AND LEVI T. DAVIS, OF McMINNVILLE, OREGON, ASSIGNORS TO DANIEL McCREARY, J. B. DAVIS, AND LEVI T. DAVIS.

Letters Patent No. 96,896, dated November 16, 1869.

COMBINED HARVESTER AND THRESHER.

The Schedule referred to in these Letters Patent and making part of the same.

*To all whom it may concern:*

Be it known that we, WILLIAM G. DAVIS and LEVI T. DAVIS, of McMinnville, Yamhill county, Oregon, have invented a new and useful Machine for Cutting, Threshing, Cleaning, and Sacking Grain; and we do hereby declare that the following is a full, clear, and exact description of the construction and operation of the same.

Our invention relates to machines for cutting and threshing grain in the field, all at one operation; and The invention consists in certain novel features in the construction of the same, as hereinafter more fully explained.

Figure 3:
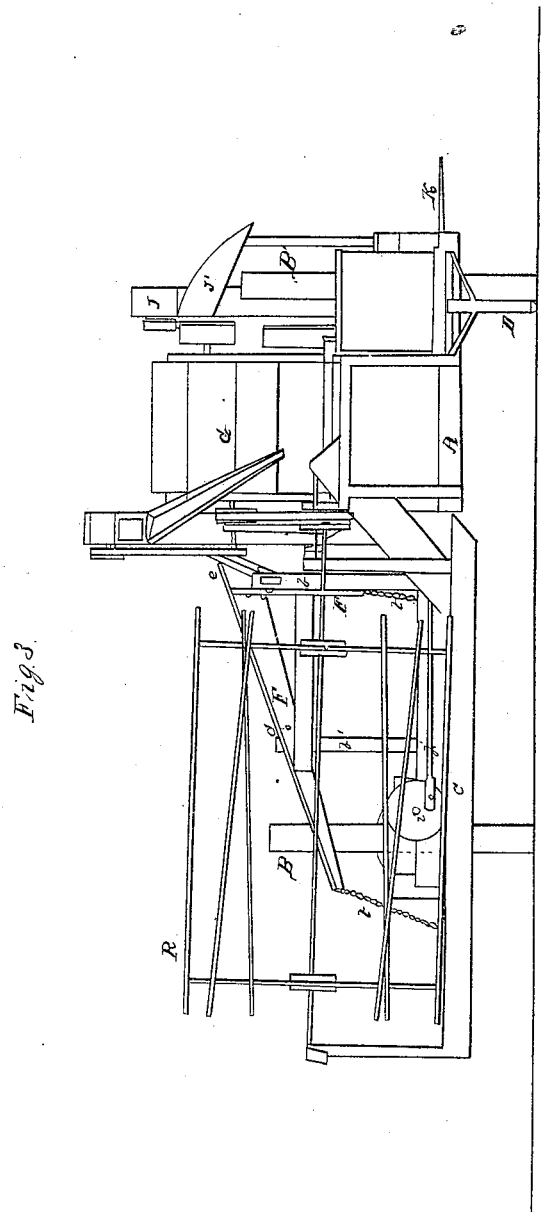
Figure 4:
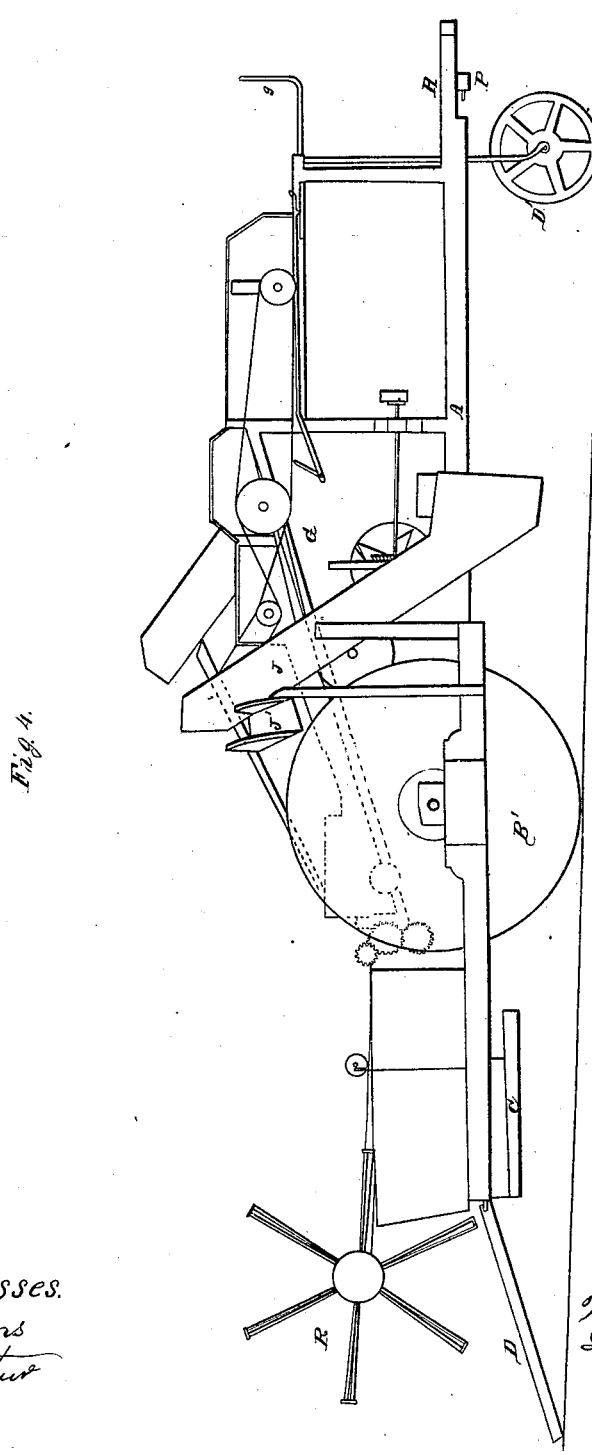
Figure 5:
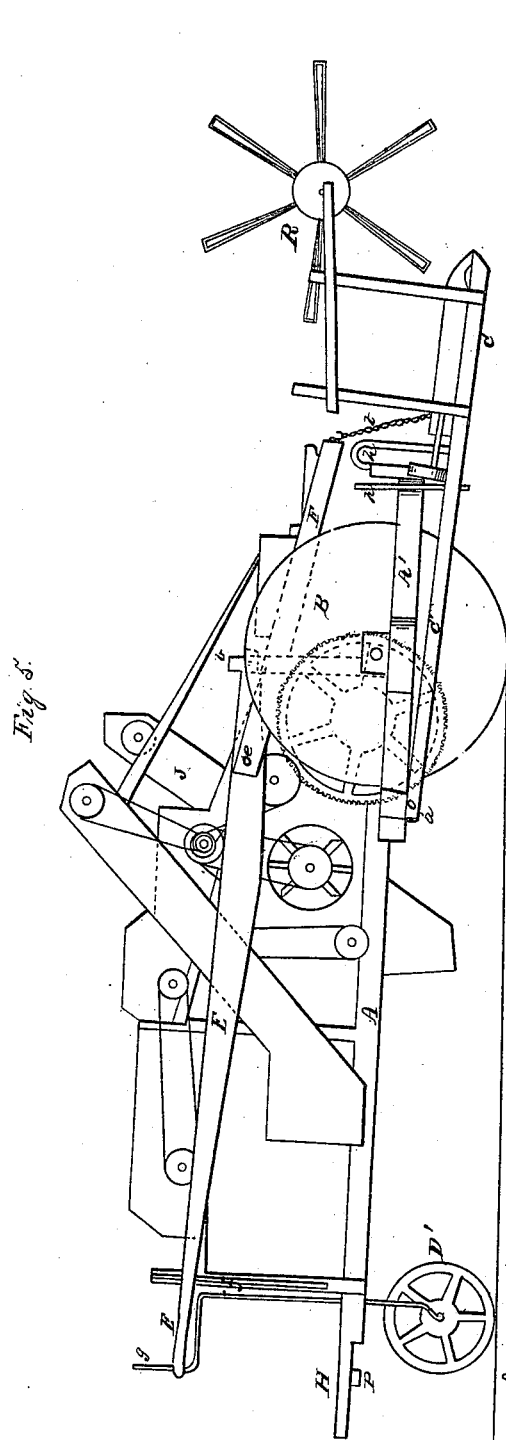

Figure 3, a front elevation;

Figure 4, a side elevation;

Figure 5, a similar view from the opposite side; and

Figure 6:
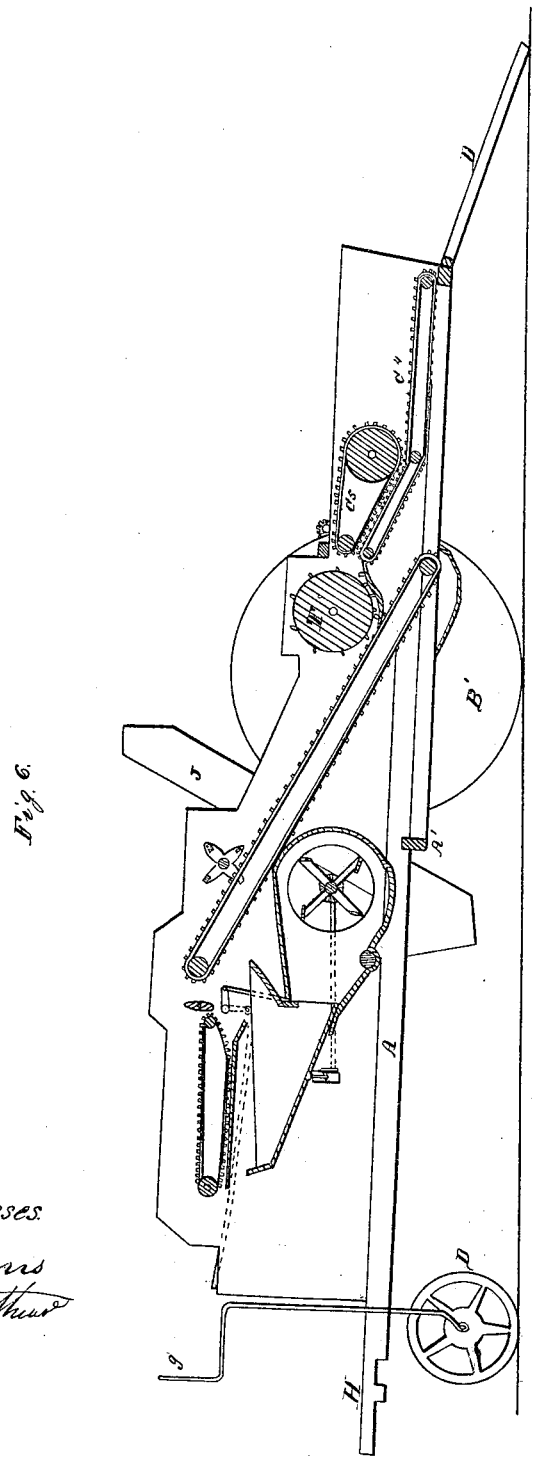

Figure 6 is a longitudinal vertical section through the threshing-part.

Our machine is intended to cut the grain by the process denominated heading—that is, to cut off the straw just below the heads of the grain, thus leaving the bulk of the straw standing in the field.

In constructing our machine, we make use of the ordinary cutting and threshing-devices, the invention consisting in the special combination and arrangement of the various parts.

Figure 1:
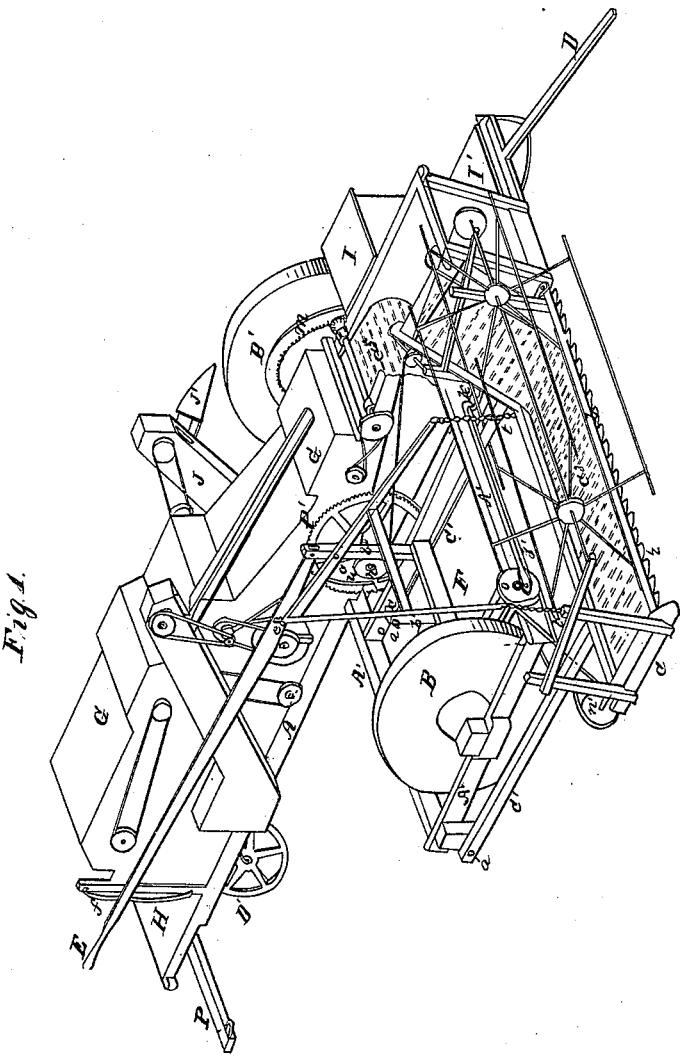
Figure 1 is a perspective view of the machine complete, ready for use.
Figure 2:
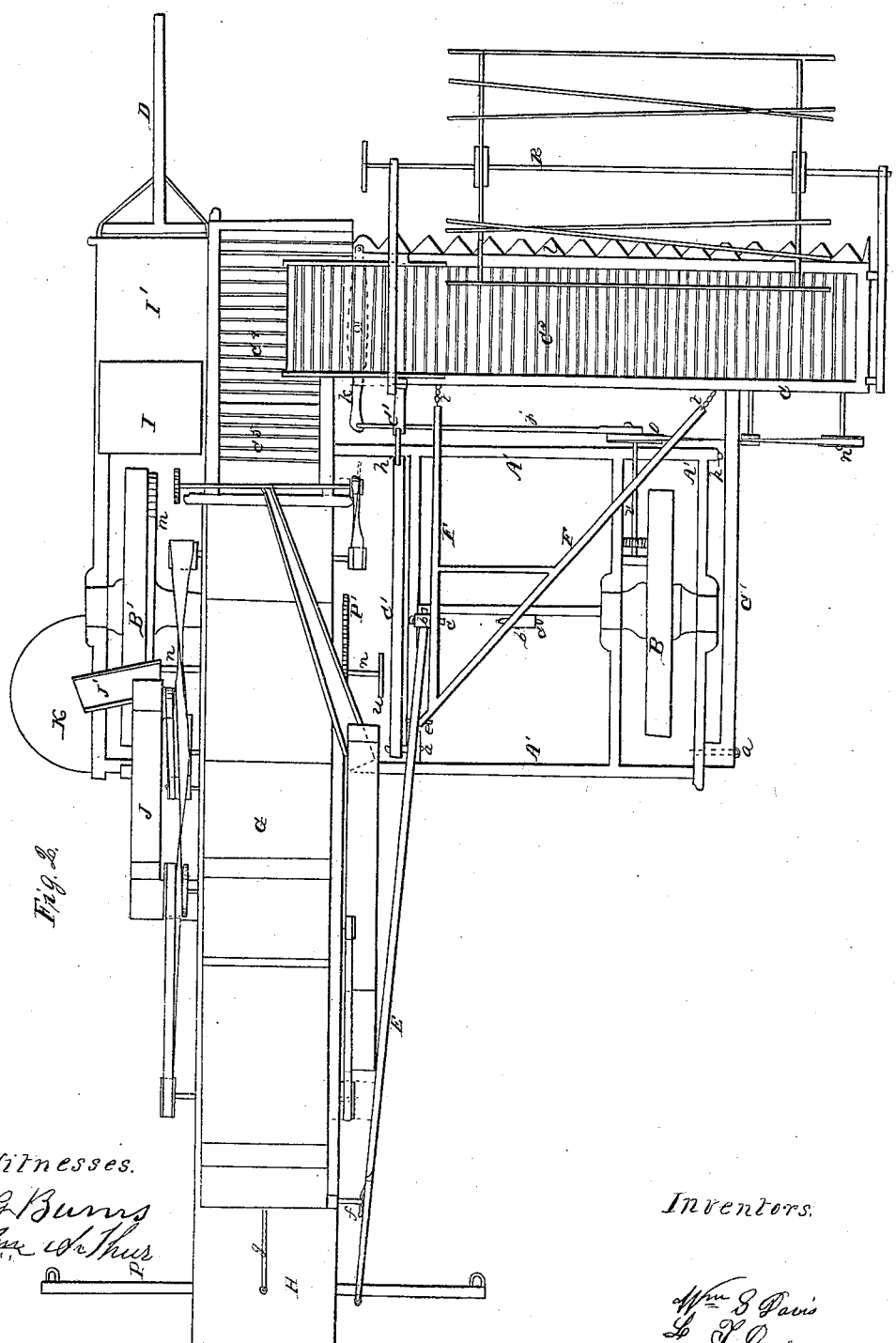
Figure 2 is a top plan view of the same.

We construct a main frame, consisting of two parts, the one part, A, extending from front to rear, under the thresher, the other part, A', projecting at right angles from the front right-hand side of the part A, as represented in figs. 1 and 2.

This frame is mounted on three wheels, two of which, B and B', are the main bearing-wheels, and are located near the centre, while the third wheel, D, is placed at the rear end, and is arranged to turn like a caster-wheel, by means of a crank, g, as represented more clearly in fig. 4.

The cutting-mechanism is mounted at the extreme front of another frame, C, which extends nearly across the entire front of the machine, and which is pivoted, by means of two arms, C', to the rear side of the frame A', by bolts, a, as shown in figs. 1 and 2.

The inner one of these arms, C', consists of two parts, as shown in fig. 2, and these parts are connected by a curved iron, h, in the form of an inverted U, as represented in fig. 5, this iron being located directly over the front bar or post of the frame A', for the purpose of permitting the frame C to be raised and lowered without coming in contact with the frame A'.

In order to raise and lower the frame C, with the sickle l, so as to cut the grain higher or lower, as may be desired, we suspend the frame C, near its front, by chains, t, from a lever, F, which is made in the form of a V-shaped frame, as represented in fig. 2, this being pivoted at c to the two upright posts b and b', secured on frame A'.

At its rear end, this lever F is pivoted, at e, to a long lever, E, which has its front end pivoted to an upright, while its rear end extends to the platform H, at the extreme rear end of the machine, the parts E and F thus forming a compound lever, by which the frame C can be raised or lowered at pleasure, by the attendant, standing on platform H, the lever E being secured in position by a catch, which engages in notches in a bar, f, secured to the rear end of the machine, as shown in figs. 1, 2, and 5.

Lengthwise of the frame C, and directly in rear of the sickle l, is located an endless belt C², which receives the grain as it is cut, and conveys it to the front end of the thresher, where it is delivered upon another apron, C¹, which carries it back until it is caught between it and another apron, C³, which, together, convey it to the threshing-cylinder, as represented in figs. 1, 2, and 6.

The threshing-machine proper, which may be of any of the improved styles, is operated by the wheel B', there being a circle of cogs or teeth, m, secured to its inner face, which gear into the teeth of a pinion on the end of a shaft, n, (see fig. 2,) which shaft passes transversely across the frame A, and carries, at its opposite end, a gear-wheel P', which communicates motion to the threshing-cylinder and other parts of the thresher.

Upon the end of the shaft n, outside of the wheel P', is a pulley, w, from which the reel R is driven.

The sickle is operated from the wheel B, it having a similar circle of cogs, which operate a shaft, i, (see fig. 2,) upon the front end of which is a pulley, o.

To this pulley o, a pitman, j, is attached, the opposite end of said pitman being pivoted to a lever, k, which latter is pivoted, at its centre, to the frame C, as shown in fig. 2, and is attached, at its front end, to the sickle l.

From the pulley o, a belt extends to another pulley, n', located at the outer end of the frame C, the shaft of which latter pulley imparts a continuous motion to the apron C², as represented in figs. 1 and 2.

It will thus be seen that the wheel B drives the cutting-mechanism and the conveyer or apron C², while the wheel B' drives the thresher and the reel R.

We provide the machine with a platform, I', and a seat, I, located directly in front of the wheel B', as shown in fig. 2, and in front of this we attach a tongue, D, for attaching a team, to assist in hauling and guiding the machine.

At the rear end is another platform, H, upon which stands the operator, who is to steer the machine by the steering-wheel D, and who also regulates the height of the cutting-apparatus, by means of the lever E.

To the rear part of the main frame, underneath the platform H, we secure a strong whiffletree or evener, P, which extends out, on each side, far enough to attach a team on each side.

In operating our machine we generally use eight horses, four in front, and four at the rear.

By this method of constructing and arranging the parts, we are enabled to make the frame so strong and rigid as to keep the working-mechanism securely in place, which is very necessary in a machine of this kind, and at the same time give to the operator, at the rear, easy and perfect control of the movements of the machine, and of the elevation or depression of the cutting-mechanism. This last is a very important feature, as the grain, in different parts of the field, often varies in height, and it is desirable to cut as little of the straw as possible and save all the heads.

In practice, the threshed grain, after being cleaned in the usual manner, is delivered, by the spouts J and J', to sacks, which, as fast as filled, are tied by a person standing on another platform, K, fig. 2, and then rolled or set upon the ground, and subsequently gathered up and hauled away by teams employed for that special purpose.

We are aware that combined harvesting and threshing-machines have been made before, and therefore we do not claim such, broadly; neither do we claim the invention of the separate cutting or threshing-machines, as such are in common use; but having thus described our invention,

What we claim, is—

1. The combination of the main frame A A', and the frame C, the latter pivoted by the arms C¹ to the rear part of the frame A', substantially as described.

2. The levers E and F, pivoted to the frame A', and connected to the swinging frame C, in the manner set forth, to enable the operator upon the rear platform to regulate the height of the cutting-apparatus at will, as described.

3. A combined header and thresher, constructed substantially as described, and having arrangements for attaching teams both at front and rear, substantially as set forth.

WM. G. DAVIS.
L. T. DAVIS.

Witnesses:
H. G. BURNS,
WM. ARTHUR.